(12) United States Patent
Heschel et al.

(10) Patent No.: US 8,008,228 B2
(45) Date of Patent: Aug. 30, 2011

(54) CARBONACEOUS SORBENT AND PROCESS FOR THE PRODUCTION THEREOF

(75) Inventors: Wolfgang Heschel, Freiberg (DE); Bernd Meyer, Freiberg (DE); Maik Werner, Freiberg (DE); Jurgen Wirling, Hurth (DE)

(73) Assignee: RWE Power Aktiengesellschaft, Essen (DE)

( * ) Notice: Subject to any disclaimer, the term of this patent is extended or adjusted under 35 U.S.C. 154(b) by 477 days.

(21) Appl. No.: 11/924,816

(22) Filed: Oct. 26, 2007

(65) Prior Publication Data

US 2008/0176743 A1 Jul. 24, 2008

(30) Foreign Application Priority Data

Oct. 26, 2006 (DE) .......................... 10 2006 050 987

(51) Int. Cl.
*C01B 31/08* (2006.01)
(52) U.S. Cl. ........................................ 502/417; 502/423
(58) Field of Classification Search .................. 502/417, 502/423
See application file for complete search history.

(56) References Cited

U.S. PATENT DOCUMENTS

| | | | |
|---|---|---|---|
| 4,491,609 A | 1/1985 | Degel et al. | |
| 4,500,327 A * | 2/1985 | Nishino et al. | 95/134 |
| 4,708,853 A | 11/1987 | Matviya et al. | |
| 4,978,650 A * | 12/1990 | Coughlin et al. | 502/432 |
| 5,080,799 A | 1/1992 | Yan | |
| 5,186,914 A | 2/1993 | Yoshihiro et al. | |
| 5,352,647 A * | 10/1994 | Suchenwirth | 502/417 |
| 6,136,749 A | 10/2000 | Gadkaree et al. | |
| 2004/0144250 A1 | 7/2004 | Neuroth et al. | |
| 2005/0019240 A1 | 1/2005 | Lu et al. | |
| 2006/0045829 A1 | 3/2006 | Dodwell et al. | |

FOREIGN PATENT DOCUMENTS

| | | |
|---|---|---|
| DE | 19530774 | 2/1997 |
| DE | 19745191 | 4/1999 |
| DE | 19936930 | 2/2001 |
| DE | 19940683 | 3/2001 |
| EP | 1025894 | 8/2000 |

OTHER PUBLICATIONS

EPO Search Report in corresponding EPO Application No. 07019226, 2 pgs.

* cited by examiner

*Primary Examiner* — Stuart Hendrickson
(74) *Attorney, Agent, or Firm* — Grossman Tucker Perreault & Pfleger, PLLC

(57) ABSTRACT

The invention concerns a carbonaceous sorbent in powder or grain form for the dry cleaning of waste gases from thermal processes. The sorbent includes carbon adsorbents from the group of activated carbon and/or brown coal cokes which are modified with sulfur and/or sulfur compounds. The sorbent is distinguished in that the specific surface area of the carbon adsorbents in $m^2/g$ in relation to the pore volume of the micropores in $cm^3/g$ is between 2400 and 2700.

4 Claims, No Drawings

CARBONACEOUS SORBENT AND PROCESS FOR THE PRODUCTION THEREOF

Carbonaceous sorbent and process for the production thereof The invention concerns a carbonaceous sorbent in powder or grain form for cleaning waste gases from thermal processes and a process for the production of a carbonaceous sorbent for dry waste gas cleaning.

The invention concerns in particular a carbonaceous sorbent in powder or grain form for the dry cleaning of waste gases from thermal processes, including carbon adsorbents from the group of activated carbon and/or brown coal cokes which are modified with sulfur and/or sulfur compounds.

The invention further concerns a process for the production of a carbonaceous sorbent for dry waste gas cleaning including the impregnation of carbons from the group of activated carbon and/or brown coals with an aqueous sulfur-bearing solution.

Carbon adsorbents are used in particular for the cleaning of waste gases from metallurgical/secondary-metallurgical processes. Waste gases from those processes contain polyhalogenated dibenzodioxins and dibenzofurans as well as heavy metals, in particular mercury. Those waste gases also entrain process dusts which can catalyse carbon oxidation and can trigger off smouldering fires in the filter installations.

A process for the cleaning of waste gases from sintering installations, smelting works or secondary-metallurgical smelting plants as well as a sorbent in dust form for the dry cleaning of such waste gases is known for example from DE 199 40 683 B4. In that process sorbents in powder form are brought into contact with the waste gas flow without preliminary removal of dust from the waste gas flow, using coke from brown coal as the sorbent. That process is carried out in the form of a per se known flying stream adsorption procedure. In that case the adsorbent in powder form is metered directly into the flow of waste gas and then separated off together with the process dust in filter installations.

In particular the brown coal coke dust used in the process in accordance with DE 199 40 683 enjoys a particularly high level of effectiveness in terms of separation of pollutants and contaminants, inter alia because of the excellent adsorption properties of brown coal coke.

It will be noted however that the excellent adsorption performance of brown coal coke dust entails an increased tendency to catching fire. Mixed with the catalytically active process dusts which occur in the waste gas, there can be an increased tendency for the dust separated off in the filter installation to catch fire so that the use of brown coal coke dust and equally the use of powder activated carbons is only limitedly possible.

Therefore DE 199 40 683 describes a process for inerting brown coal coke dust, which in principle has proved its worth. Zeolites or zeolite-bearing mineral rock are added to the brown coal coke dust, wherein the brown coal coke and the zeolite are so adjusted in dependence on the type, composition and amount of the process dust contained in the waste gas in such a way as to ensure that the solids are rendered inert.

It will be noted however that a disadvantage of the known process is that, when dealing with highly reactive process dusts as occur for example in scrap and copper preparation, considerable amounts of zeolite material have to be added to afford an adequate inerting effect, whereby the adsorption capability of the mixture is greatly reduced as, by virtue of their polar properties, zeolites do not or only inadequately adsorb elementary mercury as well as dioxins/furans.

EP 1 025 894 describes a process in which brown coal coke in powder form is doped with catalysis inhibitors which are intended to prevent metal-catalysed carbon oxidation emanating from the process dust. That process is disadvantageous insofar as the proposed substances do not exhibit inhibition of the tendency to ignition, which is equally effective for all metal catalysts, and they do not improve the sorption of elementary mercury on the brown coal coke.

A sorbent and a process of the kind set forth in the opening part of this specification are known for example from DE 199 36 930 A1. DE 199 36 930 A1 discloses a process and an apparatus for the separation of mercury from hot pyrolysis gases, wherein mercury-binding substances are introduced into the pyrolysis gas, thus affording solid mercury compounds. They are separated off at fine dust filters. The mercury-binding substances include sulfur, sulfur-doped activated carbons, hearth furnace cokes, bentonites, zeolites, trasses and/or brick powder.

A variant of the process proposed in DE 199 36 930 provides that sulfuric acid, hydrogen fluoride and/or hydrogen chloride are introduced as a gas or a liquid into the pyrolysis gas, mixed with the pyrolysis gas and caused to react with the metallic mercury. The resulting reaction products are separated off at hot gas filters.

In another variant of the process as described in DE 199 36 930 sulfur-doped activated carbons or hearth furnace cokes, zeolites, bentonites, trasses or other organic fine dusts having a sulfur content of between 10 and 30% by weight are introduced into the pyrolysis gas. It is further proposed therein that sulfur and activated carbon should be introduced separately from each other or in the form of a mixture into the pyrolysis gas. Instead of adding sulfur it is alternatively proposed that sulfur-delivering substances can be used, for example sodium tetrasulfide and sodium thiosulfate. The decomposition of those substances provides that elementary sulfur is separated off in finely divided form and thus facilitates the reaction with mercury. The substances thus introduced into the pyrolysis gas are to be removed from the gas with suitable filters.

Cokes or activated carbons doped with sulfur or sulfur compounds have an improved separation capability in relation to heavy metals, in particular they are improved in regard to the separation of elementary mercury. It has been found however that those properties are to the detriment of adsorption capability for organic compounds, in particular for dioxins and furans. For that reason the sorbents described in DE 199 36 930 are not suitable for exhaust gas cleaning downstream of metallic and/or secondary-metallic installations. In addition carbon adsorbents have an increased tendency to catch fire, which is undesirable in connection with carbon oxidation-catalysing constituents in the process dust or in the waste gas.

Known sorbents therefore either have particular properties for the separation of heavy metals or particular properties for the separation of organic compounds.

Therefore the object of the invention is to provide a carbonaceous sorbent which has a high level of sorption capability for elementary mercury and at the same time a high adsorption capacity for organic contaminants and pollutants, in particular for polyhalogenated dibenzodioxins and/or dibenzofurans. Furthermore the invention seeks to provide that the sorbent is safe in terms of its tendency to catch fire.

A further object of the invention is to provide a suitable process for the production of such a sorbent.

The object of the invention is firstly attained by a carbonaceous sorbent in powder or grain form for the dry cleaning of waste gases from thermal processes, including carbon adsorbents from the group of activated carbon and/or brown coal cokes which are modified with sulfur and/or sulfur compounds, wherein the sorbent according to the invention is distinguished in that the specific surface area of the carbon adsorbents in m²/g, with respect to the pore volume of the micropores in cm³/g (index H) is between 2400 and 2700.

In a preferred variant of the sorbent according to the invention the index H is between 2500 and 2650.

The index H is the quotient of the specific surface area determined in accordance with what is referred to as the BET method and the micropore volume in accordance with the IUPAC standard (micropores of a width (diameter) of $\leq 2$ nm in cm³/g). The micropore volume in that diameter range is determined by gas adsorption in accordance with the Dubinin-Radushkevich isomer model. BET measurement involves a widespread analysis method of determining the magnitude of surface areas by means of gas sorption (Brunauer, Emmet and Teller).

Surprisingly it has been found that a carbonaceous sorbent in powder form, the carbon adsorbents of which are modified with sulfur and/or sulfur compounds, and the specific surface area of which in relation to the pore volume is of the above-mentioned order of magnitude, with approximately the same adsorption performance for organic substances, has a comparatively lower tendency to ignition than carbon adsorbents which are doped with sulfur and sulfur compounds and the index H of which is outside the claimed range. The impregnation process according to the invention is distinguished by lesser blocking of adsorption-effective micropores for dioxins/furans while reactivity with mercury or other metals remains substantially unaffected.

As is also described hereinafter the above-mentioned ratio of the specific surface area to the pore volume is only achieved by a particular treatment of the carbon adsorbents. In the case of the conventional spray or dip impregnation of the carbon adsorbents with sulfur-bearing compounds in aqueous solution, the result is a reduced adsorption capability for organic contaminants and pollutants. In particular the pore volume is greatly reduced, which directly entails a reduction in the adsorption capacity for organic pollutants and contaminants. By virtue of the greater pore volume, a greater chemical reactivity would be expected from a carbonaceous sorbent whose index H (specific surface area in relation to the pore volume) assumes the above-mentioned order of magnitude. Surprisingly however it has been found that the carbonaceous sorbent according to the invention is uncritical in regard to its tendency to ignition.

Preferably brown coal cokes are provided as carbon adsorbents.

A further preferred variant of the sorbent according to the invention provides that the carbon adsorbents are modified with a polysulfide, preferably with an alkali metal polysulfide.

The process for the production of a carbonaceous sorbent for dry waste gas cleaning according to the invention includes the impregnation of carbons from the group of activated carbons and/or brown coals with an aqueous sulfur-bearing solution, wherein the process is distinguished in that the sulfur-bearing solution is added with agitation of the carbons in a closed mixing container under an increased pressure or a reduced pressure.

As mentioned hereinbefore the aqueous solution can contain a polysulfide, preferably the aqueous solution can contain a disodium tetrasulfide.

In a particularly preferred variant of the invention it is provided that the treatment is effected in the mixing container under a controlled addition of oxygen.

The oxygen concentration in the mixing container can be so adjusted that the polysulfide experiences in-situ partial oxidation to afford elementary sulfur.

With the process according to the invention it is particularly advantageous that the reaction heat which occurs upon agitation of the constituents of the mixture in the closed container and also the frictional heat introduced into the material being mixed by the intensive thorough mixing effect cause such a rise in temperature in the material being mixed that the solvent partially dries up during the mixing operation. That is sufficient to produce a product which is pourable or capable of trickle flow and which does not require any post-drying operation.

In a particularly preferred feature the sulfur solution is added with a proportion of between 1 and 15% by mass, preferably with a proportion of between 1 and 7% by mass.

The invention is described hereinafter by means of a number of examples.

EXAMPLE 1

500 parts by weight of brown coal coke dust (hearth furnace coke (HFC) Super RWE Power AG, Cologne) are sprayed in an Eirich mixer (Type R02, capacity 5 l, from G Eirich Maschinenfabrik) with 65.8 parts by weight of a 40% $Na_2S_4$ solution, which by calculation corresponds to an $Na_2S_4$ content of the impregnated coke of 5% by mass. The $Na_2S_4$ solution is meteredly fed into the mixer within 68 s in the form of a spray cone which is produced by a hollow cone nozzle (0.2 mm) under a pressure of 14 bars. The mixing pot involves a rotary speed of 90 min$^{-1}$, the vane agitator rotates in opposite relationship at 3000 min$^{-1}$. Initially air at ambient temperature was to be found in the mixer. After opening of the mixer a temperature of 80° C. was measured. The water content (DIN 51718) of the sample was determined as 4.4% by mass. The coke sample was capable of trickle flow. The $Na_2S_4$ content of the sample, calculated back from the measured sulfur content (DIN 51724) was 5.16% by mass.

As a measurement in respect of the tendency to ignition, taking a mixture of 20 parts by weight of the impregnated coke dust and 80 parts by weight of a metallurgical process dust, the combustion number thereof was determined in accordance with VDI 2263 (see for example Heschel et al: Ein verbessertes Mess- und Auswerteverfahren zur Bestimmung der Brennzahl von Stäuben nach VDI-Richtlinie 2263. Gefahrstoffe—Reinhaltung der Luft 63 (2003), 469-474) ['An improved measurement and assessment process for determining the combustion number of dusts in accordance with the VDI Guideline 2263. Danger substances—keeping the air clean']. In that case the prismatically shaped test bulk material of the coke-process dust mixture is caused to ignite with a glowing platinum coil and the nature of propagation of the fire is characterised by specifying a combustion number. With a combustion number of 4 the initiated smoldering fire is propagated over the entire test material. A combustion number of 3 is characterised by local burning or smoldering with an extremely slight degree of propagation and is therefore classified as harmless from the point of view of safety technology. An average combustion number of 2 was determined (brief ignition, rapid extinction).

The adsorption capability in respect of the impregnated coke sample for 1,3-dichlorobenzene and toluene in a vapor atmosphere saturated at 20° C. was measured (static adsorption). The two organic compounds are representative of the class of substances of polyhalogenated dibenzodioxins/furans. The adsorption capacity for mercury vapor was measured by means of a laboratory fixed bed adsorber. The measurement conditions were as follows: entry concentration for elementary mercury 850 µg/m³; adsorber temperature 90° C.;

vacuum gas speed 1.7 cm/s; carrier gas with 14% by volume oxygen, balance nitrogen, water vapor-saturated at 8° C.

In addition the coke sample was acted upon with a waste gas from an industrial installation for recycling steel works dusts, which contained dioxins/furans as well as mercury in predominantly elementary form and which was at a temperature of 90° C. The degree of separation for dioxins/furans as well as the loading with mercury of the impregnated coke sample and in comparative terms for the untreated coke was determined under identical measurement conditions.

The process according to the invention produced a brown coal coke having advantageously modified use properties for waste gas cleaning, in particular the reactivity thereof in a mixture with metallurgical process dust was reduced from the original combustion number 4 to the combustion number 2. The Hg loading rose in the laboratory test from 20 µg/g to 142 µg/g. Under the waste gas conditions in the industrial installation the Hg loading was increased from 20 µg/g for the untreated coke to 32 µg/g for the impregnated coke sample, while the degree of separation for dioxins/furans was reduced by the impregnation operation from 97.3% to only 75.6%, that is to say by 20% relative (Table 1). For 1,3-dichlorobenzene and toluene, 1.5 mmol/g and 2.2 mmol/g respectively were measured, corresponding to 10% less than for the untreated coke. It can be seen from FIG. 1 that the frequency of the micropores which are not accessible for stearic reasons to the pollutants or contaminants ($\leq 0.5$ mm pore width) is significantly less than in the initial coke. The moisture content of the coke sample, due to the rise in temperature in the mixer, fell from initially 7.4% by mass to 4.5% by mass so that the result obtained was a coke capable of trickle flow.

EXAMPLE 2

500 parts by weight of brown coal coke dust were sprayed as described in embodiment 1 with 138.9 parts by weight of a 40% $Na_2S_4$ solution, which in terms of calculation corresponds to an $Na_2S_4$ content of the impregnated coke of 10% by mass. The $Na_2S_4$ solution was meteredly added to the mixer within 144 s. The $Na_2S_4$ content calculated back from the sulfur content of the coke sample was 9.72% by mass. The temperature rose to 95° C.

The result obtained was a brown coal coke, the reactivity of which was reduced in the mixture with metallurgical process dust from a combustion number 4 to a combustion number 2. The Hg loading rose in the laboratory test from 20 µg/g to 139 µg/g. Under the waste gas conditions of the industrial installation the Hg loading showed practically no increase (Table 1). The equilibrium loading was 1.1 mmol/g (−28%) for 1,3-dichlorobenzene and 1.9 mmol/g (−20%) for toluene. The moisture content of the coke sample was reduced by the drying effect during the mixing operation from initially 14.3 to 5.2% by mass so that a coke capable of trickle flow was also obtained.

EXAMPLE 3

The coke sample produced in accordance with embodiment 1 was acted upon in a laboratory fixed bed adsorber at 90° C. with a model gas comprising 4500 ppmv $SO_2$, 0.4% by volume $H_2O$, 14% by volume $O_2$ and 880 µg Hg/m³ at 90° C. In contrast to the measurement conditions in embodiment 1 (without $SO_2$ in the model gas), all mercury was removed from the gas due to the presence of $SO_2$ over a period of 12 h.

EXAMPLE 4

Comparative Test

The following example documents the known state of the art in terms of fluid impregnation of adsorbents and serves to clearly illustrate the mode of operation of the process according to the invention.

20 parts by weight of brown coal coke dust (HFC Super RWE Power AG, Cologne) are added to the aqueous $Na_2S_4$ solution which is present in excess and the concentration of which was set to 1.5, 10 and 20% respectively, and intensively mixed therewith. After a stand time for the suspension of one hour, it was separated by way of a paper filter and the filter residue dried in a drying cabinet at 105° C. for 4 h. The following were determined in respect of the sample which was ground up in the mortar, as set forth in Example 1: sulfur content, combustion number, 1,3-DCB and toluene equilibrium loading respectively, and Hg loading. The results are shown in Table 2. The result obtained was a brown coal coke, the reactivity of which only reaches the combustion number of 2 at a sulfur content of 7.43% by mass. The higher $Na_2S_4$ concentration which is to be found in comparison with Example 1 on the coke (10.09 vs. 5.16% by mass) has the result that more micropores are blocked (FIG. 2) and as a consequence thereof the absorption capacity for 1,3-DCB and toluene respectively is reduced more greatly as a percentage than in Example 1.

TABLE 1

Results of the application tests with a waste gas from an industrial installation for recycling steel works dusts

| | Raw gas | Adsorbent (doped) | Adsorbent (untreated) |
|---|---|---|---|
| Embodiment 1 | | BCCD1833/1 + 5% by mass $Na_2S_4$ (spray impregnated) | BCCD1833/1 |
| Mercury | | | |
| Hg loading adsorbent [µg/g] | 400-700 µg/m³ | 32 | 20 |
| Hg loading increase by [%] | — | +56.1 | — |
| Dioxins/furans | | | |
| PCDD/F concentration (ng/m³)[1] | 0.037 ng/m³ | 0.009 (clean gas) | 0.001 (clean gas) |
| PCDD/F degree of separation [%] | — | 75.6 | 97.3 |
| Embodiment 2 | | BCCD1833/1 + 10% by mass $Na_2S_4$ (spray impregnated) | BCCD1833/1 |
| Mercury | | | |
| Hg loading adsorbent [µg/g] | 400-800 µg/m³ | 24.5 | 24.3 |
| Hg loading increase by [%] | | +0.8 | |

[1]Toxicity equivalent 17th BlmSchV I-TEQ (limit value 0.1 ng/m³).

TABLE 2

Comparison of the carbon adsorbents modified in accordance with the invention of Example 1 with dip impregnation of the carbon adsorbents of Example 4 (state of the art) and with untreated brown coal coke

| | $Na_2S_4$ content for combustion number = 2 [% by mass] | DCB loading [mmol/g] | Toluene loading [mmol/g] | Hg loading [μg/g] |
|---|---|---|---|---|
| Example 1 | 5.16 | 1.5 | 2.2 | 142 |
| Example 4 | 10.09 | 1.2 | 1.8 | 140 |

| | BET [$m^2$/g] | Micropore vol. ≦2. nm [$cm^3$/g] | s [nm] | Index H [$m^2/cm^3$] |
|---|---|---|---|---|
| Example 1 | 137.3 | 0.0523 | 1.435 | 2.621 |
| Example 4 | 25.3 | 0.0108 | 2.334 | 2.330 |
| BCCD 1833/1 (untreated) | 277.7 | 0.1079 | 1.123 | 2.573 |

As can be seen from Table 2 the comparison of an adsorbent produced in accordance with Example 1 with a sorbent produced in accordance with Example 4 (state of the art) shows for the sorbent according to the invention with about half the $Na_2S_4$ doping (5.16% by mass: 10.09% by mass), even better loadability for organic pollutants and contaminants (DCB loading 1.5: 1.2/toluene loading 2.2: 1.8) with approximately the same mercury loadability. Admittedly the process in accordance with the state of the art (Example 4) also achieves a combustion number of 2 but that is with an incomparably higher level of use of sodium tetrasulfide and with a lower level of loadability for organic contaminants and pollutants, which can also be seen from the adsorption pore width identified by 's'. The mean adsorption pore width of untreated brown coal coke is 1.123 nm, that of the sorbent in accordance with the state of the art is 2.334 nm and that of the sorbent according to the invention is 1.435 nm.

The invention claimed is:

1. A process for the production of a carbonaceous sorbent for dry waste gas cleaning including the impregnation of carbons from brown coals with an aqueous sulfur-bearing solution containing a polysulfide wherein the sulfur-bearing solution is added with agitation of the carbons in a closed mixing container under an increased pressure or a reduced pressure and under a controlled addition of oxygen, wherein the polysulfide experiences an in-situ partial oxidation to afford elementary sulfur, wherein said agitation causes an increase in temperature such that water is dried up to the point where said sorbent is pourable and does not require post-drying.

2. A process as set forth in claim 1 wherein the aqueous solution contains a polysulfide.

3. A process as set forth in claim 1 wherein the aqueous solution contains a disodium tetrasulfide.

4. A process as set forth in claim 1 wherein the sulfur solution is added with a proportion of between 1 and 15% by mass, preferably with a proportion of between 1 and 7% by mass.

* * * * *